United States Patent
Qiao et al.

(10) Patent No.: US 12,174,603 B2
(45) Date of Patent: Dec. 24, 2024

(54) EQUIPMENT CONTROL METHOD, EQUIPMENT CONTROL APPARATUS AND STORAGE MEDIUM

(71) Applicant: BEIJING XIAOMI MOBILE SOFTWARE CO., LTD., Beijing (CN)

(72) Inventors: Guangjun Qiao, Beijing (CN); Bing Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 462 days.

(21) Appl. No.: 17/326,315

(22) Filed: May 20, 2021

(65) Prior Publication Data

US 2022/0155738 A1    May 19, 2022

(30) Foreign Application Priority Data

Nov. 13, 2020    (CN) .......................... 202011270944.2

(51) Int. Cl.
*G05B 19/042*        (2006.01)
(52) U.S. Cl.
CPC .. *G05B 19/042* (2013.01); *G05B 2219/23258* (2013.01); *G05B 2219/25062* (2013.01)
(58) Field of Classification Search
CPC ........ G05B 19/042; G05B 2219/23258; G05B 2219/25062; G05B 15/02; G05B 19/418;
(Continued)

(56) References Cited

U.S. PATENT DOCUMENTS 11,044,405 B1 *   6/2021   Meyer ................... G06F 1/1626
2004/0121725 A1 * 6/2004   Matsui ................... G08C 23/04
                                                        348/E5.103
(Continued)

FOREIGN PATENT DOCUMENTS

CN        111212182 A        5/2020
CN        114090140 A    *   2/2022
(Continued)

OTHER PUBLICATIONS

Translation of CN-114090140-A.*
(Continued)

*Primary Examiner* — Charles R Kasenge
(74) *Attorney, Agent, or Firm* — Syncoda LLC; Feng Ma

(57) ABSTRACT

An equipment control method, applied to a mobile terminal, includes: positioning, in response to the mobile terminal pointing to equipment to be controlled in which an external ultra-wideband positioning device is installed, the external ultra-wideband positioning device, the external ultra-wideband positioning device having a binding relationship with the equipment to be controlled; determining the equipment to be controlled that is bound to the external ultra-wideband positioning device based on the binding relationship, in response to positioning to the external ultra-wideband positioning device; and retrieving and displaying a control interface of the equipment to be controlled that matches the equipment to be controlled. When the terminal points to the equipment to be controlled, it can automatically select and control the equipment to be controlled in which an external ultra-wideband positioning device is installed, such that the equipment that originally had no ultra-wideband positioning control can be controlled automatically and intelligently.

11 Claims, 6 Drawing Sheets

(58) Field of Classification Search
CPC ........ G05B 2219/2642; G08C 2201/30; G08C 2201/70; G08C 2201/71; G08C 2201/91; G08C 2201/93; G08C 17/02
See application file for complete search history.

(56) References Cited

U.S. PATENT DOCUMENTS

| | | |
|---|---|---|
| 2005/0033835 A1 | 2/2005 | Kinjo |
| 2009/0270065 A1* | 10/2009 | Hamada ................. G08B 7/066 455/404.1 |
| 2015/0326704 A1* | 11/2015 | Ko .................... H04M 1/72457 455/456.3 |
| 2017/0162036 A1* | 6/2017 | Agardh .................. G08C 17/02 |
| 2019/0180609 A1* | 6/2019 | Tchedikian ............ G08C 17/02 |

FOREIGN PATENT DOCUMENTS

| | | |
|---|---|---|
| CN | 111476988 B | 5/2022 |
| EP | 3176766 A1 | 6/2017 |
| IN | 201647013635 A | 9/2017 |
| JP | 2004166193 A | 6/2004 |
| JP | 2004304228 A | 10/2004 |

OTHER PUBLICATIONS

OA for IN application 202144039872, mailed on May 24, 2022.
OA for JP application 2021-151217 mailed on Nov. 1, 2022.
Search Report for EP application 21176356.0, mailed on Nov. 25, 2021.
First OA for CN application 202011270944.2, mailed on Jan. 26, 2024.

\* cited by examiner

EQUIPMENT CONTROL METHOD, EQUIPMENT CONTROL APPARATUS AND STORAGE MEDIUM

CROSS-REFERENCE TO RELATED APPLICATION

This application claims priority to Chinese Patent Application No. 202011270944.2 filed on Nov. 13, 2020, the disclosure of which is hereby incorporated by reference in its entirety.

BACKGROUND

Smart home equipment, such as smart humidifiers, smart air conditioners, smart lighting equipment, smart security equipment, etc., are more and more coming into people's view, bringing smart and convenient experiences to users.

SUMMARY

The present disclosure generally relates to the field of terminal technologies, and more specifically, to an equipment control method, an equipment control apparatus and a storage medium.

According to an aspect of the embodiments of the present disclosure, there is provided an equipment control method applied to a mobile terminal, the equipment control method including: positioning, in response to the mobile terminal pointing to equipment to be controlled in which an external ultra-wideband positioning device is installed, the external ultra-wideband positioning device, the external ultra-wideband positioning device having a binding relationship with the equipment to be controlled; determining the equipment to be controlled that is bound to the external ultra-wideband positioning device based on the binding relationship, in response to positioning to the external ultra-wideband positioning device; and retrieving and displaying a control interface of the equipment to be controlled that matches the equipment to be controlled.

In some embodiments, there is a binding relationship between the external ultra-wideband positioning device and the equipment to be controlled, which is determined in the following manner: determining that there is equipment to be controlled in which an external ultra-wideband positioning device is installed, and acquiring a first identifier for uniquely identifying the external ultra-wideband positioning device; and creating and saving a binding relationship between the first identifier and the equipment to be controlled.

In some embodiments, the creating and saving the binding relationship between the first identifier and the equipment to be controlled includes: displaying, in a pop-up window, prompt information on a display interface of a predetermined application, in response to positioning to the external ultra-wideband positioning device for the first time, the prompt information being used to guide the generation of a second identifier used to identify the equipment to be controlled; generating the second identifier according to an identifier provided by the user based on the prompt information; and creating and saving the binding relationship between the first identifier and the second identifier.

In some embodiments, the positioning to the external ultra-wideband positioning device includes: determining positioning to the external ultra-wideband positioning device when the external ultra-wideband positioning device is positioned within a predetermined range of a distance from the mobile terminal, and/or, determining positioning to the external ultra-wideband positioning device when the external ultra-wideband positioning device is positioned within a predetermined range of pointing angle with the pointing direction of the mobile terminal.

In some embodiments, the equipment control method further includes: switching to a control interface of second equipment to be controlled, which matches the second equipment to be controlled, in response to the mobile terminal pointing to the second equipment to be controlled in which an external ultra-wideband positioning device is installed, in a process of displaying a control interface of first equipment to be controlled by the mobile terminal.

According to another aspect of the embodiments of the present disclosure, there is provided an equipment control apparatus applied to a mobile terminal, the equipment control apparatus including: a positioning component, configured to position, in response to the mobile terminal pointing to equipment to be controlled in which an external ultra-wideband positioning device is installed, the external ultra-wideband positioning device, the external ultra-wideband positioning device having a binding relationship with the equipment to be controlled; a determining component, configured to determine the equipment to be controlled bound to the external ultra-wideband positioning device based on the binding relationship, in response to positioning to the external ultra-wideband positioning device; and a displaying component, configured to retrieve and display a control interface of the equipment to be controlled that matches the equipment to be controlled.

In some embodiments, the external ultra-wideband positioning device having a binding relationship with the equipment to be controlled is determined in the following manner: determining that there is equipment to be controlled in which an external ultra-wideband positioning device is installed, and acquiring a first identifier for uniquely identifying the external ultra-wideband positioning device; and creating and saving a binding relationship between the first identifier and the equipment to be controlled.

In some embodiments, the creating and saving the binding relationship between the first identifier and the equipment to be controlled includes: displaying, in a pop-up window, prompt information on a display interface of a predetermined application, in response to positioning to the external ultra-wideband positioning device for the first time, the prompt information being used to guide the generation of a second identifier used to identify the equipment to be controlled; generating the second identifier according to an identifier provided by the user based on the prompt information; and creating and saving the binding relationship between the first identifier and the second identifier.

In some embodiments, the positioning component is configured to position to the external ultra-wideband positioning device in the following manner: determining positioning to the external ultra-wideband positioning device when the external ultra-wideband positioning device is positioned within a predetermined range of a distance from the mobile terminal, and/or, determining positioning to the external ultra-wideband positioning device when the external ultra-wideband positioning device is positioned within a predetermined range of pointing angle with the pointing direction of the mobile terminal.

In some embodiments, the equipment control apparatus further includes: a switching component, configured to switch to a control interface of second equipment to be controlled, which matches the second equipment to be controlled, in response to the mobile terminal pointing to the second equipment to be controlled in which an external ultra-wideband positioning device is installed, in a process of displaying a control interface of first equipment to be controlled by the mobile terminal.

According to another aspect of the embodiments of the present disclosure, there is provided an equipment control apparatus, including: a processor; memory for storing executable instructions of the processor; wherein the processor is configured to execute any one of the foregoing equipment control methods.

According to yet another aspect of the embodiments of the present disclosure, there is provided a non-transitory computer-readable storage medium. When the instructions stored in the storage medium are executed by a processor of a mobile terminal, the mobile terminal can execute any of the foregoing equipment control methods.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this description, illustrate embodiments consistent with the disclosure and, together with the description, serve to explain the principles of the disclosure.

DETAILED DESCRIPTION

Figure 1:
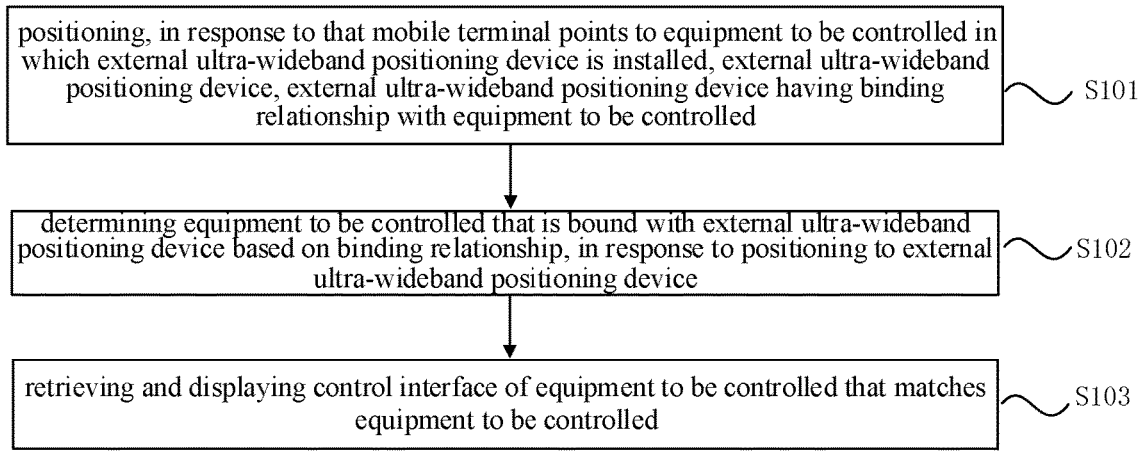
FIG. 1 is a flowchart showing an equipment control method according to some embodiments of the present disclosure.

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Smart home equipment brings smart and convenient experiences to users. To enable the smart home equipment to run normally and complete a personalized operation, applications for controlling the smart home equipment are installed on terminals such as smart phones by users. When the home equipment is used, the applications for controlling the equipment are initiated at the terminal, and the operations are performed on the operating interface of the smart home equipment, so as to realize the control of the smart home equipment, for example, the opening and closing of the working states, the setting of working parameters, etc.

A variety of smart home equipment improves users' living environment, but at the same time, the control and adjustment of the equipment are cumbersome and unintelligent, which brings inconvenience to users.

Ultra-wideband (UWB) technology, which is different from traditional communication technologies, realizes wireless transmission by transmitting and receiving extremely narrow pulses in a level of nanoseconds or microseconds or less. Through ultra-large bandwidth and low transmitting power, fast data transmission at low power consumption is achieved. Compared with traditional narrowband systems, ultra-wideband systems have various advantages of strong penetrating power, low power consumption, good anti-multipath effects, high security, low complexity of system, and accurate positioning accuracy, and so on.

Ultra-wideband technology is used for positioning, that is, pre-arranged anchor nodes and bridge nodes with known locations are used to communicate with newly added blind nodes, and position by measuring the transmission delay differences between different base stations and mobile terminals. The extremely narrow pulses in the level of nanoseconds or microseconds or less are used to realize the characteristics of wireless transmission, and calculate the time of the signal flying in the air by detecting the position of the signal pulse and combining with certain positioning methods. This time is multiplied by the signal transmission rate in the air to obtain the distance between the detection equipment and the detected equipment to achieve the purpose of positioning, and the accuracy can reach the centimeter-level precise positioning.

Although with the continuous increase in the configuration of mobile terminals, the terminals are equipped with ultra-wideband positioning components, the stock household appliances and office equipment that are widely used in people's work and life environments are not equipped with ultra-wideband positioning devices during production, thereby they cannot be positioned using ultra-wideband technology in use.

Thus, the present disclosure provides an equipment control method, in which, through the installation of the external ultra-wideband positioning device in the equipment to be controlled, the external ultra-wideband positioning device can be positioned by using a mobile terminal. When positioning to the external ultra-wideband positioning device, the control interface of the equipment to be controlled that matches the equipment to be controlled is retrieved and displayed on the terminal based on the binding relationship between the external ultra-wideband positioning device and the equipment to be controlled, and the equipment to be controlled is controlled, such that an automatic and smart control of the equipment to be controlled can be realized.

FIG. 1 is a flowchart showing an equipment control method according to some embodiments. As shown in FIG. 1, the equipment control method is used in a mobile terminal. The mobile terminal can be a smart phone, a tablet computer, or wearable equipment, etc. The embodiments of the present disclosure do not limit the types of the equipment to which the equipment control method is applied. Referring to FIG. 1, the equipment control method includes the following steps.

In step S101, the external ultra-wideband positioning device is positioned, in response to the mobile terminal pointing to the equipment to be controlled in which an external ultra-wideband positioning device is installed, and there is a binding relationship between the external ultra-wideband positioning device and the equipment to be controlled.

In step S102, the equipment to be controlled that is bound to the external ultra-wideband positioning device is determined, based on the binding relationship, in response to positioning to the external ultra-wideband positioning device.

In step S103, a control interface of the equipment to be controlled that matches the equipment to be controlled is retrieved and displayed.

In the embodiments of the present disclosure, the equipment to be controlled may be an air conditioner, a TV, a speaker, a refrigerator, a lamp, and other devices without a built-in ultra-wideband positioning component. There is a binding relationship between the external ultra-wideband positioning device and the equipment to be controlled, and there is a one-to-one correspondence. The external ultra-wideband positioning device can be fixedly installed on the surface, frame, bottom or back of the equipment to be controlled. The mobile terminal is equipped with an ultra-wideband positioning component, points to the equipment to be controlled in which an external ultra-wideband positioning device is installed, and positions the external ultra-wideband positioning device, the ultra-wideband positioning component of the mobile terminal communicates with the external ultra-wideband positioning device, and then the relative positional relationship between the mobile terminal and the external ultra-wideband positioning device, that is, the relative distance and/or relative direction and the angle relationship between the mobile terminal and the external ultra-wideband positioning device are determined.

It can be understood that the relative positional relationship between the mobile terminal and the external ultra-wideband positioning device, that is, the direction angle and distance between the mobile terminal and the external ultra-wideband positioning device, is determined by an angle of arrival positioning method. Herein, by the angle of arrival positioning method, the angle of arrival between the mobile terminal and the external ultra-wideband positioning device is measured, the ray formed by taking the external ultra-wideband positioning device as a starting point must pass through the external ultra-wideband positioning device, and the intersection of the two rays is the position of the external ultra-wideband positioning device. Then, the direction angle and distance is calculated based on the coordinates of the position. The relative positional relationship between the mobile terminal and the equipment to be controlled can also be determined by an ultra-wideband positioning method, such as an AOA positioning method, a TOF positioning method, a TOA positioning method, or a TDOA positioning method.

The mobile terminal positions to the external ultra-wideband positioning device, and based on the binding relationship between the external ultra-wideband positioning device and the equipment to be controlled, determines the equipment to be controlled that is bound to the external ultra-wideband positioning device, and retrieves and displays the control interface of the equipment to be controlled that matches the equipment to be controlled. The control interface of the equipment to be controlled includes touch buttons for controlling the equipment to be controlled, and the control signal for controlling the equipment to be controlled is transmitted by the user to the equipment to be controlled through the touch buttons on the control interface, displayed on the mobile terminal, to realize the control of the equipment to be controlled, for example, the opening, closing or parameter adjustment settings of the equipment to be controlled.

According to the embodiments of the present disclosure, by binding the external ultra-wideband positioning device and the equipment to be controlled, when the mobile terminal is pointing to the equipment to be controlled in which an external ultra-wideband positioning device is installed, the external ultra-wideband positioning device is positioned to, and then the equipment to be controlled that is bound to the external ultra-wideband positioning device is determined. A control interface of the equipment to be controlled that matches the equipment to be controlled is retrieved and displayed at the terminal to control the equipment to be controlled, such that when the terminal points to the equipment to be controlled, the equipment to be controlled that is installed with an external ultra-wideband positioning device is automatically selected and controlled, thereby the equipment to be controlled that originally had no ultra-wideband positioning control can be controlled automatically and intelligently based on the ultra-wideband positioning technologies to improve the operation efficiency.

Figure 2:
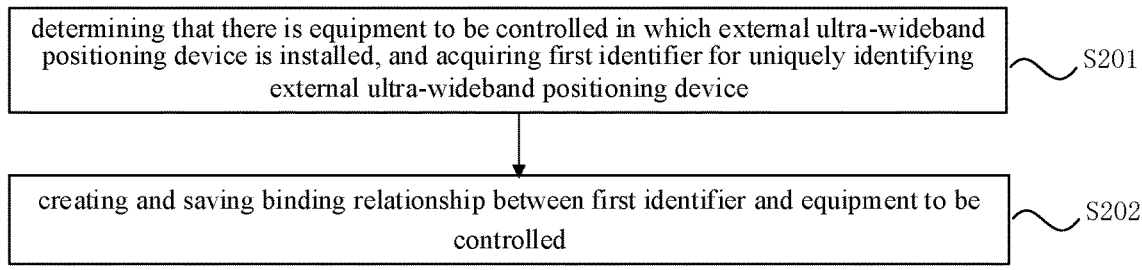
FIG. 2 is a flowchart showing a method for determining that there is a binding relationship between an external ultra-wideband positioning device and equipment to be controlled according to some embodiments of the present disclosure.

FIG. 2 is a flowchart showing a method for determining a binding relationship between an external ultra-wideband positioning device and equipment to be controlled according to some embodiments of the present disclosure. As shown in FIG. 2, the method for determining the binding relationship between the external ultra-wideband positioning device and the equipment to be controlled includes the following steps.

In step S201, it is determined that there is equipment to be controlled in which an external ultra-wideband positioning device is installed, and a first identifier for uniquely identifying the external ultra-wideband positioning device is acquired.

In step S202, the binding relationship between the first identifier and the equipment to be controlled is created and saved.

In the embodiments of the present disclosure, in a scenario where the mobile terminal controls the equipment to be controlled for the first time, the external ultra-wideband positioning device is bound with the equipment to be controlled. The mobile terminal is equipped with an ultra-wideband positioning component, and when pointing to the equipment to be controlled in which an external ultra-wideband positioning device is installed, it is determined that there is an external ultra-wideband positioning device through the direction and distance relationship determined by the ultra-wideband positioning component. The first identifier for uniquely identifying the external ultra-wideband positioning device is acquired, and the first identifier is bound with the equipment to be controlled in which the external ultra-wideband positioning device is installed. The first identifier can be the MAC address of the external ultra-wideband positioning device or the unique identifier of other external ultra-wideband positioning devices.

A binding relationship between the first identifier and the equipment to be controlled is created in the mobile terminal, and the binding relationship is saved, such that when the equipment to be controlled is subsequently controlled, the control is performed based on the binding relationship between the first identifier and the equipment to be controlled. When there is a lot of equipment to be controlled, the binding relationship between the first identifier and the equipment to be controlled is created and saved, respectively, for a lot of equipment to be controlled.

According to the embodiments of the present disclosure, in the scenario where the mobile terminal controls the equipment to be controlled for the first time, the external ultra-wideband positioning device and the equipment to be controlled are bound to determine the binding relationship between the external ultra-wideband positioning device and the equipment to be controlled. Therefore, in the subsequent use, the binding relationship is used to realize the control of the equipment to be controlled by positioning the external ultra-wideband positioning device, which facilitates the control experience of the device.

Figure 3:
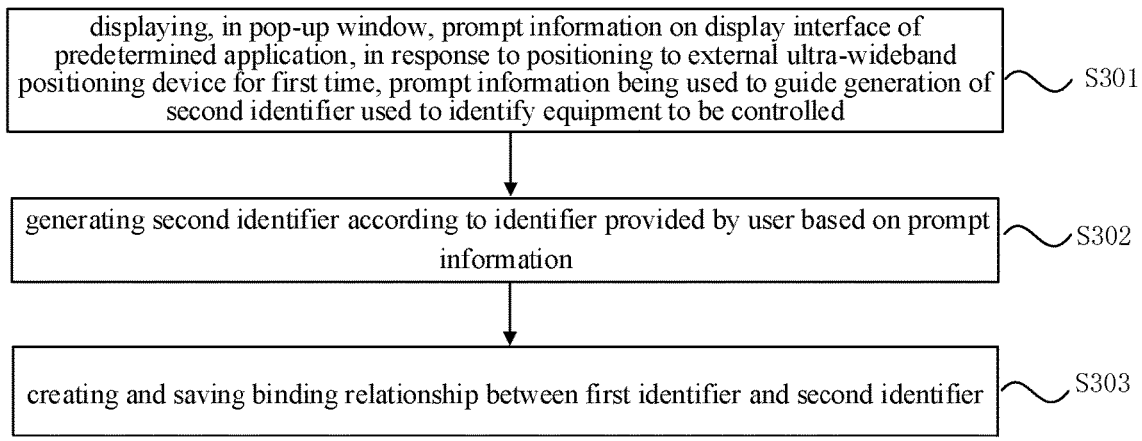
FIG. 3 is a flowchart showing a method for creating and saving a binding relationship between a first identifier and equipment to be controlled according to some embodiments of the present disclosure.

FIG. 3 is a flowchart showing a method for creating and saving a binding relationship between a first identifier and equipment to be controlled according to some embodiments of the present disclosure. As shown in FIG. 3, the method for creating and saving the binding relationship between the first identifier and the equipment to be controlled includes the following steps.

In step S301, prompt information is displayed in a pop-up window on the display interface of the predetermined application, in response to positioning to the external ultra-wideband positioning device for the first time. The prompt information is used to guide the generation of a second identifier, and the second identifier is used to identify the equipment to be controlled.

In step S302, a second identifier is generated according to an identifier provided by the user based on the prompt information.

In step S303, the binding relationship between the first identifier and the second identifier is created and saved.

In the embodiments of the present disclosure, in a scenario where the mobile terminal controls the equipment to be controlled for the first time, the external ultra-wideband positioning device is bound with the equipment to be controlled. The mobile terminal is equipped with an ultra-wideband positioning component, and when pointing to the equipment to be controlled in which an external ultra-wideband positioning device is installed, it is determined that there is an external ultra-wideband positioning device through the direction and distance relationship determined by the ultra-wideband positioning component. That is, the mobile terminal points to the equipment to be controlled in which the external ultra-wideband positioning device is installed for the first time, and the mobile terminal positions to the external ultra-wideband positioning device through the disposed ultra-wideband positioning component, and the binding of the external ultra-wideband positioning device and the equipment to be controlled is realized in a predetermined application for controlling the equipment to be controlled. The prompt information is displayed in a pop-up window, on the display interface of the predetermined application, to guide the user to generate a second identifier which is used to identify the equipment to be controlled.

The user can provide the an identifier based on the prompt information in the predetermined application for controlling the equipment to be controlled, the second identifier can be generated in the predetermined application, and the binding relationship between the first identifier and the second identifier can be created and saved, that is, the binding of the external ultra-wideband positioning device and the equipment to be controlled can be realized.

In some embodiments of the present disclosure, taking the process of creating a binding relationship between a mobile phone and an air conditioner by a user as an example, the mobile phone is equipped with an ultra-wideband positioning component, and the air conditioner is equipped with an external ultra-wideband positioning device to make the mobile phone point to the location of the air conditioner to be controlled. The user's mobile phone can position to the external ultra-wideband positioning device, and obtain a first identifier that identifies the external ultra-wideband positioning device, and the first identifier is unique. In an application of the mobile phone to control the air conditioner, the prompt information is displayed in the pop-up window, to prompt the user to position to the external ultra-wideband positioning device. Based on the prompt information, the user provides a second identifier for identifying the air conditioner, for example, "study-room air conditioner". According to the identifier of the "study-room air conditioner" provided by the user based on the prompt information, the second identifier of "study-room air conditioner" is generated in the application of the mobile phone to control the air conditioner, and a binding relationship between the first identifier and the second identifier is created to realize the binding between the mobile phone and the air conditioner. In the subsequent use, when the mobile phone is used by the user to point to the living-room air conditioner, the temperature adjustment, air volume adjustment, opening or closing of the living-room air conditioner bound thereto can be realized, according to the first identifier of the external ultra-wideband positioning device positioned to.

According to the embodiments of the present disclosure, the external ultra-wideband positioning device is positioned to for the first time, the prompt information is displayed in the pop-up window on the display interface of the predetermined application, and the binding relationship between the first identifier and the second identifier is created and saved according to the identifier provided by the user based on the prompt information. The binding relationship between the first identifier and the second identifier can be directly used to control the equipment to be controlled in subsequent use, so as to further realize the smart and convenient control of the equipment to be controlled.

Figure 4:
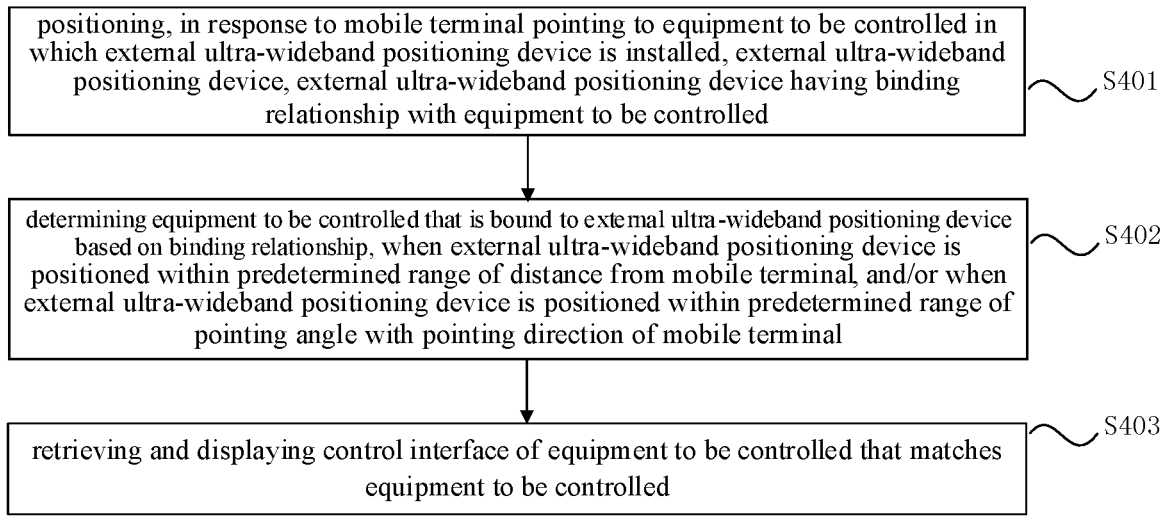
FIG. 4 is a flowchart showing an equipment control method according to some embodiments of the present disclosure.

FIG. 4 is a flowchart showing an equipment control method according to some embodiments of the present disclosure. As shown in FIG. 4, the equipment control method includes the following steps.

In step S401, the external ultra-wideband positioning device is positioned, in response to the mobile terminal pointing to the equipment to be controlled in which the external ultra-wideband positioning device is installed, and there is a binding relationship between the external ultra-wideband positioning device and the equipment to be controlled.

In step S402, if the external ultra-wideband positioning device is positioned within a predetermined range of a distance from the mobile terminal, and/or if the external ultra-wideband positioning device is positioned within a predetermined range of pointing angle with the pointing direction of the mobile terminal, the equipment to be controlled that is bound with the external ultra-wideband positioning device is determined based on the binding relationship.

In step S403, the control interface of the equipment to be controlled that matches the equipment to be controlled is retrieved and displayed.

In the embodiments of the present disclosure, there is a binding relationship between the external ultra-wideband positioning device and the equipment to be controlled, and there is a one-to-one correspondence. The mobile terminal is provided with an ultra-wideband positioning component and points to the equipment to be controlled in which the external ultra-wideband positioning device is installed, and the external ultra-wideband positioning device is positioned.

The mobile terminal determines the equipment to be controlled that is bound with the external ultra-wideband positioning device within the predetermined space range. The predetermined space range includes a predetermined angle with the mobile terminal and/or a predetermined distance from the mobile terminal. The external ultra-wideband positioning device is positioned to within the predetermined distance from the mobile terminal, and the equipment to be controlled that is bound with the external ultra-wideband positioning device is determined based on the binding relationship between the external ultra-wideband positioning device and the equipment to be controlled, to realize the control of the equipment to be controlled at the terminal.

In the embodiments of the present disclosure, it is also possible to position to the external ultra-wideband positioning device within the predetermined pointing angle range with the pointing direction of the mobile terminal, based on the binding relationship between the external ultra-wideband positioning device and the equipment to be controlled, the equipment to be controlled that is bound with the external ultra-wideband positioning device is determined, so as to realize the control of the equipment to be controlled at the terminal. The predetermined distance and predetermined angle can be set in advance according to the accuracy of the ultra-wideband positioning component, the user's usage conditions, usage preferences, etc.

The mobile terminal positions to the external ultra-wideband positioning device, and retrieves and displays the control interface of the equipment to be controlled that matches the equipment to be controlled, the control interface of the equipment to be controlled includes touch buttons for controlling the equipment to be controlled, through the touch button on the control interface displayed on the mobile terminal, a control signal of the equipment to be controlled is transmitted by the user to the equipment to be controlled, so as to realize the control of the equipment to be controlled.

According to the embodiments of the present disclosure, the mobile terminal points to the equipment to be controlled in which the external ultra-wideband positioning device is installed, the equipment to be controlled that is bound with the external ultra-wideband positioning device is determined, at the mobile terminal, within a predetermined distance and/or range, and the control interface of the equipment to be controlled is retrieved and displayed to control the equipment to be controlled, which realizes the accurate and effective control of the equipment to be controlled.

Figure 5:
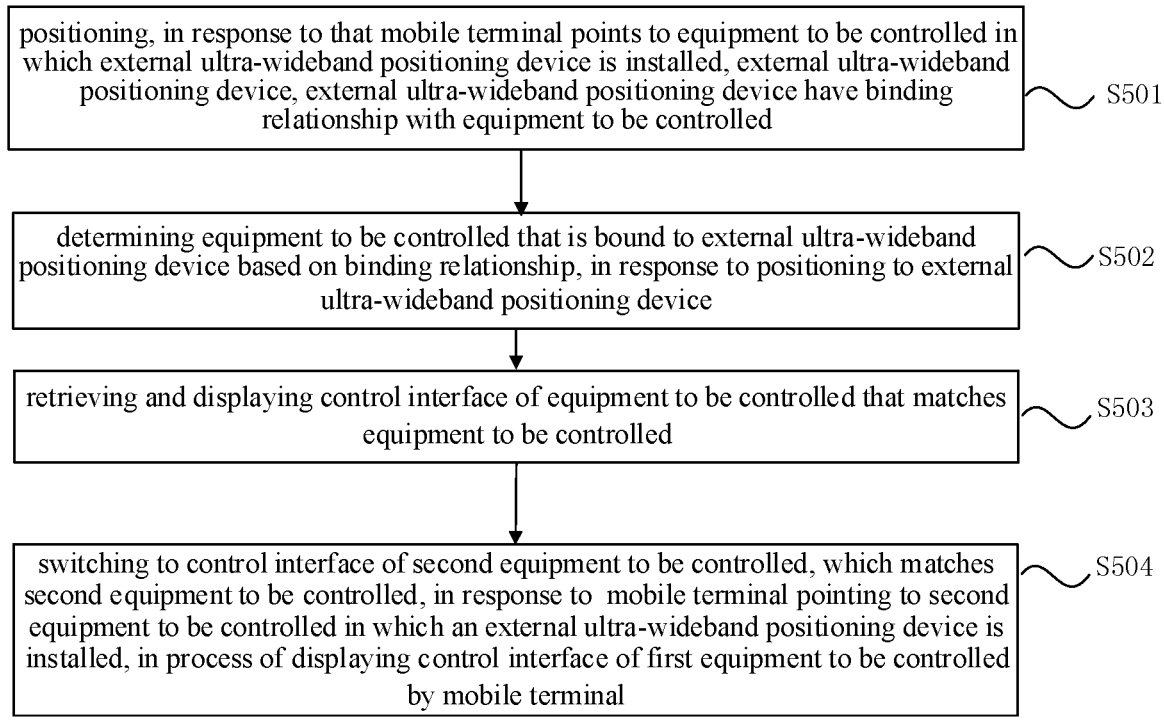
FIG. 5 is a flowchart showing an equipment control method according to some embodiments of the present disclosure.

FIG. 5 is a flowchart showing an equipment control method according to some embodiments of the present disclosure. As shown in FIG. 5, the equipment control method includes the following steps.

In step S501, the external ultra-wideband positioning device is positioned, in response to the mobile terminal pointing to the equipment to be controlled in which the external ultra-wideband positioning device is installed, and there is a binding relationship between the external ultra-wideband positioning device and the equipment to be controlled.

In step S502, the equipment to be controlled that is bound with the external ultra-wideband positioning device is determined, based on the binding relationship, in response to positioning to the external ultra-wideband positioning device.

In step S503, the control interface of the equipment to be controlled that matches the equipment to be controlled is retrieved and displayed.

In step S504, a control interface of second equipment to be controlled that matches the second equipment to be controlled is switched to, in response to the mobile terminal pointing to the second equipment to be controlled in which an external ultra-wideband positioning device is installed, in a process of displaying a control interface of first equipment to be controlled by the mobile terminal.

In the embodiments of the present disclosure, the external ultra-wideband positioning device and the equipment to be controlled have a binding relationship, and there is a one-to-one correspondence. The mobile terminal is provided with an ultra-wideband positioning component, and points to the equipment to be controlled in which the external ultra-wideband positioning device is installed, and the external ultra-wideband positioning device is positioned.

The mobile terminal positions to the first equipment to be controlled in which the external ultra-wideband positioning device is installed, and determines the first equipment to be controlled that is bound with the external ultra-wideband positioning device, based on the binding relationship between the external ultra-wideband positioning device and the first equipment to be controlled, and retrieves and displays the control interface of the first equipment to be controlled that matches the first equipment to be controlled. The control interface of the first equipment to be controlled includes touch buttons for controlling the first equipment to be controlled, and a control signal is transmitted by the user to the first equipment to be controlled through the touch buttons, displayed on the mobile terminal, on the control interface of the first equipment to be controlled, to realize the control of the first equipment to be controlled.

During the process of displaying the control interface of the first equipment to be controlled by the mobile terminal, due to the user's movement or changes in space, and changes in usage requirements, the mobile terminal points to the second equipment to be controlled in which an external ultra-wideband positioning device is installed, so as to control the second equipment to be controlled.

The mobile terminal positions to the second equipment to be controlled in which the external ultra-wideband positioning device is installed, and determines the second equipment to be controlled that is bound with the external ultra-wideband positioning device, based on the binding relationship between the external ultra-wideband positioning device and the second equipment to be controlled, and retrieves and displays the control interface of the second equipment to be controlled that matches the second equipment to be controlled. The control interface of the second equipment to be controlled includes touch buttons for controlling the second equipment to be controlled, and a control signal is transmitted by the user to the second equipment to be controlled through the touch buttons, displayed on the mobile terminal, on the control interface of the second equipment to be controlled, to realize the control of the second equipment to be controlled.

At the display interface of the mobile terminal, the control interface of the first equipment to be controlled that matches the first equipment to be controlled is switched to the control interface of the second equipment to be controlled that matches the second equipment to be controlled.

According to the embodiments of the present disclosure, during the process of displaying the control interface of the first equipment to be controlled by the mobile terminal, the mobile terminal points to the second equipment to be controlled in which an external ultra-wideband positioning device is installed, and switches to the control interface of the second equipment to be controlled that matches the second equipment to be controlled such that a switch between a lot of equipment to be controlled can be realized, when there are a plurality of equipment to be controlled in the range of the mobile terminal, thereby improving the convenient operation of controlling a lot of equipment to be controlled.

Figure 6A:
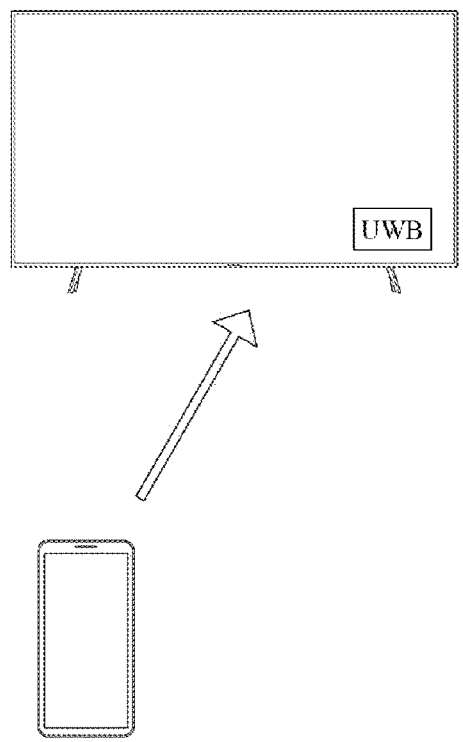
FIG. 6A is a first schematic diagram illustrating an equipment control method according to some embodiments of the present disclosure.
Figure 6B:
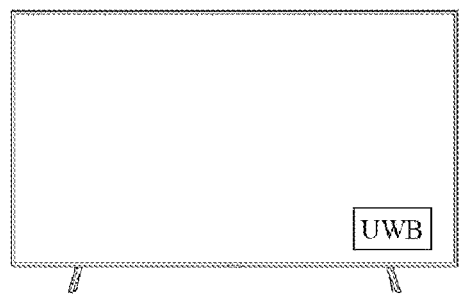
FIG. 6B is a second schematic diagram illustrating an equipment control method according to some embodiments of the present disclosure.
Figure 6B:
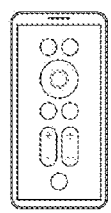
Figure 6C:
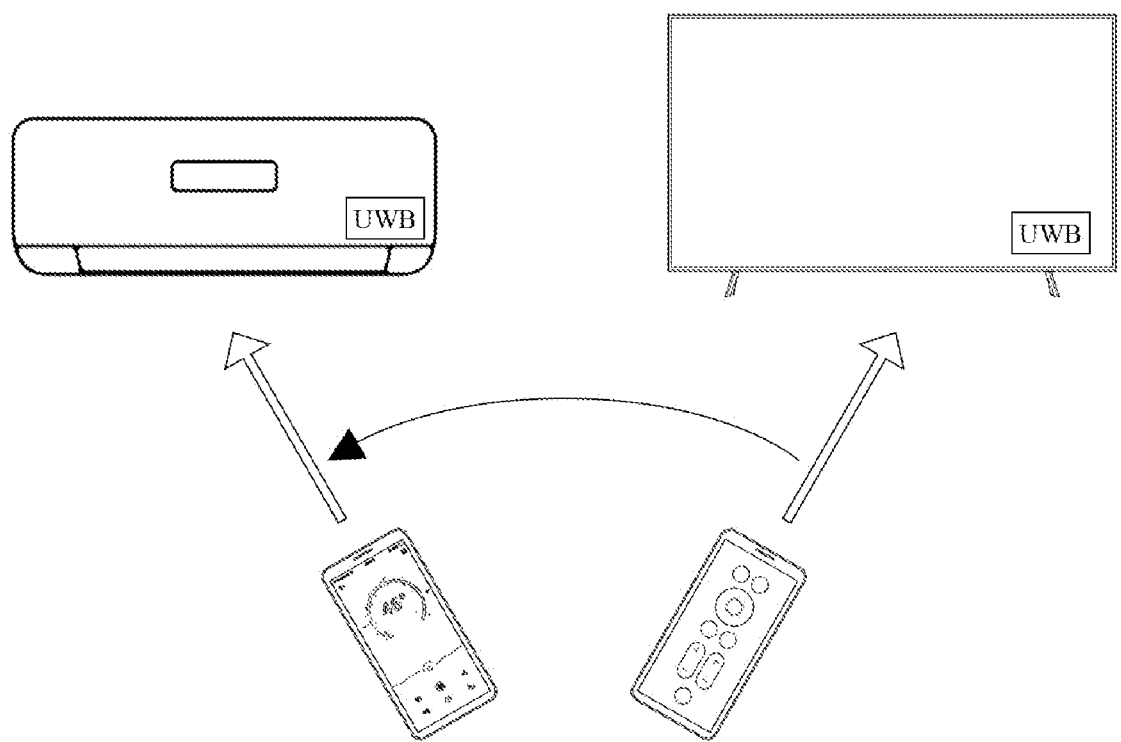
FIG. 6C is a third schematic diagram illustrating an equipment control method according to some embodiments of the present disclosure.

FIGS. 6A to 6C are schematic diagrams showing an equipment control method according to some embodiments of the present disclosure. FIG. 6A shows that a user points to a TV by using a mobile phone to control the TV. The mobile phone is equipped with an ultra-wideband positioning component, the TV is equipped with an external ultra-wideband positioning device, the mobile phone points to the location of the TV to be controlled, and the mobile phone can position to the external ultra-wideband positioning device installed on the TV. When the mobile phone is used to control the TV for the first time, a binding relationship between the mobile phone and the TV is created.

Referring to FIG. 6B, FIG. 6B shows that the user points to a TV by using a mobile phone, the mobile phone positions to the external ultra-wideband positioning device installed on the TV, it is determined that the current equipment to be controlled is the TV, based on the binding relationship between the external ultra-wideband positioning device installed on the TV and the TV, and the control interface of the equipment to be controlled that matches the TV is retrieved and displayed on the mobile phone. When it is not the first time that the mobile phone is used to control the TV, the binding relationship between the mobile phone and the TV, stored in the mobile phone, is acquired.

Referring to FIG. 6C, FIG. 6C shows that the mobile phone is used by the user to control, the mobile phone is positioned to the external ultra-wideband positioning device installed on the TV, and based on the binding relationship between the external ultra-wideband positioning device installed on the TV and the TV, it is determined that the current equipment to be controlled is the TV, and the control interface of the equipment to be controlled that matches the TV is retrieved and displayed on the mobile phone. There also exists, nearby, an air conditioner in which an external ultra-wideband positioning device is installed. When the user needs to control the air conditioner, the user turns to use the mobile phone to point to the air conditioner, and the mobile phone points to the location of the air conditioner to be controlled, and can position to the external ultra-wideband positioning device installed in the air conditioner. When the mobile phone is used to control the air conditioner for the first time, a binding relationship between the mobile phone and the air conditioner is created. When it is not the first time that the mobile phone is used to control the air conditioner, the binding relationship between the mobile phone and the air conditioner stored in the mobile phone is acquired. The mobile phone positions to the external ultra-wideband positioning device installed in the air conditioner, it is determined that the current equipment to be controlled is the air conditioner, based on the binding relationship between the external ultra-wideband positioning device installed in the air conditioner and the air conditioner, and the control interface of the air conditioner is switched and displayed on the mobile phone.

Based on the similar concept, embodiments of the present disclosure also provide an equipment control apparatus.

It can be understood that, in order to realize the above-mentioned functions, the equipment control apparatus provided in the embodiments of the present disclosure includes hardware structures and/or software modules corresponding to each function. In combination with the units and method steps of the examples disclosed in the embodiments of the present disclosure, the embodiments of the present disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions of the embodiments of the present disclosure.

Figure 7:
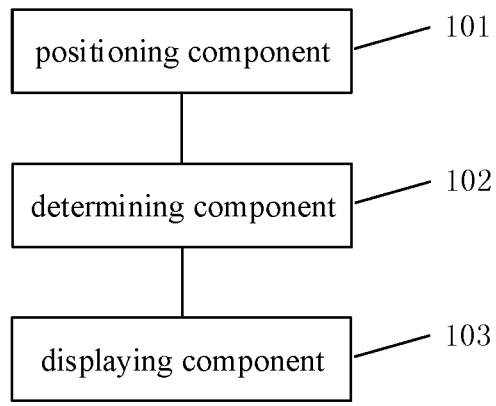
FIG. 7 is a block diagram showing an equipment control apparatus according to some embodiments of the present disclosure.

FIG. 7 is a block diagram showing an equipment control apparatus according to some embodiments of the present disclosure. Referring to FIG. 7, the equipment control apparatus 100 includes a positioning component 101, a determining component 102 and a displaying component 103.

The positioning component 101 is used to position the external ultra-wideband positioning device, in response to the mobile terminal pointing to the equipment to be controlled in which the external ultra-wideband positioning device is installed, and there is a binding relationship between the external ultra-wideband positioning device and the equipment to be controlled.

The determining component 102 is used to determine the equipment to be controlled that is bound with the external ultra-wideband positioning device, based on the binding relationship, in response to positioning to the external ultra-wideband positioning device.

The displaying component 103 is used to retrieve and display the control interface of the equipment to be controlled that matches the equipment to be controlled.

In some embodiments, there is a binding relationship between the external ultra-wideband positioning device and the equipment to be controlled, which is determined in the following manner: determining that there is equipment to be controlled in which an external ultra-wideband positioning device is installed, and acquiring a first identifier for uniquely identifying the external ultra-wideband positioning device; and creating and saving a binding relationship between the first identifier and the equipment to be controlled.

In some embodiments, creating and saving the binding relationship between the first identifier and the equipment to be controlled includes: displaying, in a pop-up window, prompt information on the display interface of the predetermined application, in response to positioning to the external ultra-wideband positioning device for the first time, the prompt information being used to guide the generation of a second identifier used to identify the equipment to be controlled; generating the second identifier according to an identifier provided by the user based on the prompt information; and creating and saving the binding relationship between the first identifier and the second identifier.

In some embodiments, the positioning component 101 is positioned to the external ultra-wideband positioning device in the following manner: determining positioning to the external ultra-wideband positioning device when the external ultra-wideband positioning device is positioned within a predetermined range of a distance from the mobile terminal, and/or, determining positioning to the external ultra-wideband positioning device when the external ultra-wideband positioning device is positioned within a predetermined range of pointing angle with the pointing direction of the mobile terminal.

Figure 8:
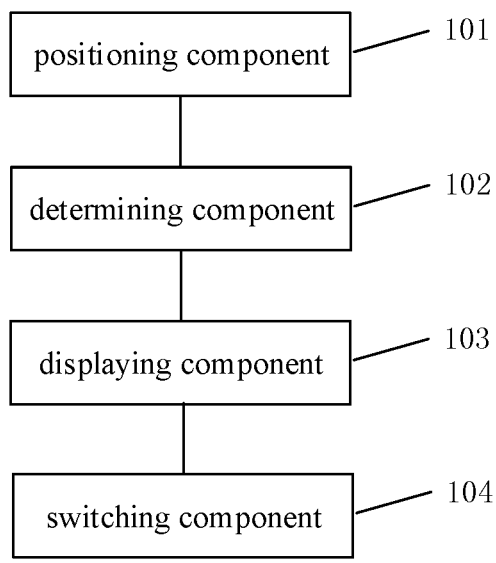
FIG. 8 is a block diagram showing an equipment control apparatus according to some embodiments of the present disclosure.

FIG. 8 is a block diagram showing an equipment control apparatus according to some embodiments of the present disclosure. Referring to FIG. 8, the equipment control apparatus 100 further includes a switching component 104.

The switching component 104 is used to switch to a control interface of second equipment to be controlled, which matches the second equipment to be controlled, in response to the mobile terminal pointing to the second equipment to be controlled in which an external ultra-wideband positioning device is installed, in a process of displaying a control interface of first equipment to be controlled by the mobile terminal.

With respect to the apparatus in the above embodiments, the specific manners for performing operations for individual modules therein have been described in detail in the embodiments regarding the methods, which will not be elaborated herein.

Figure 9:
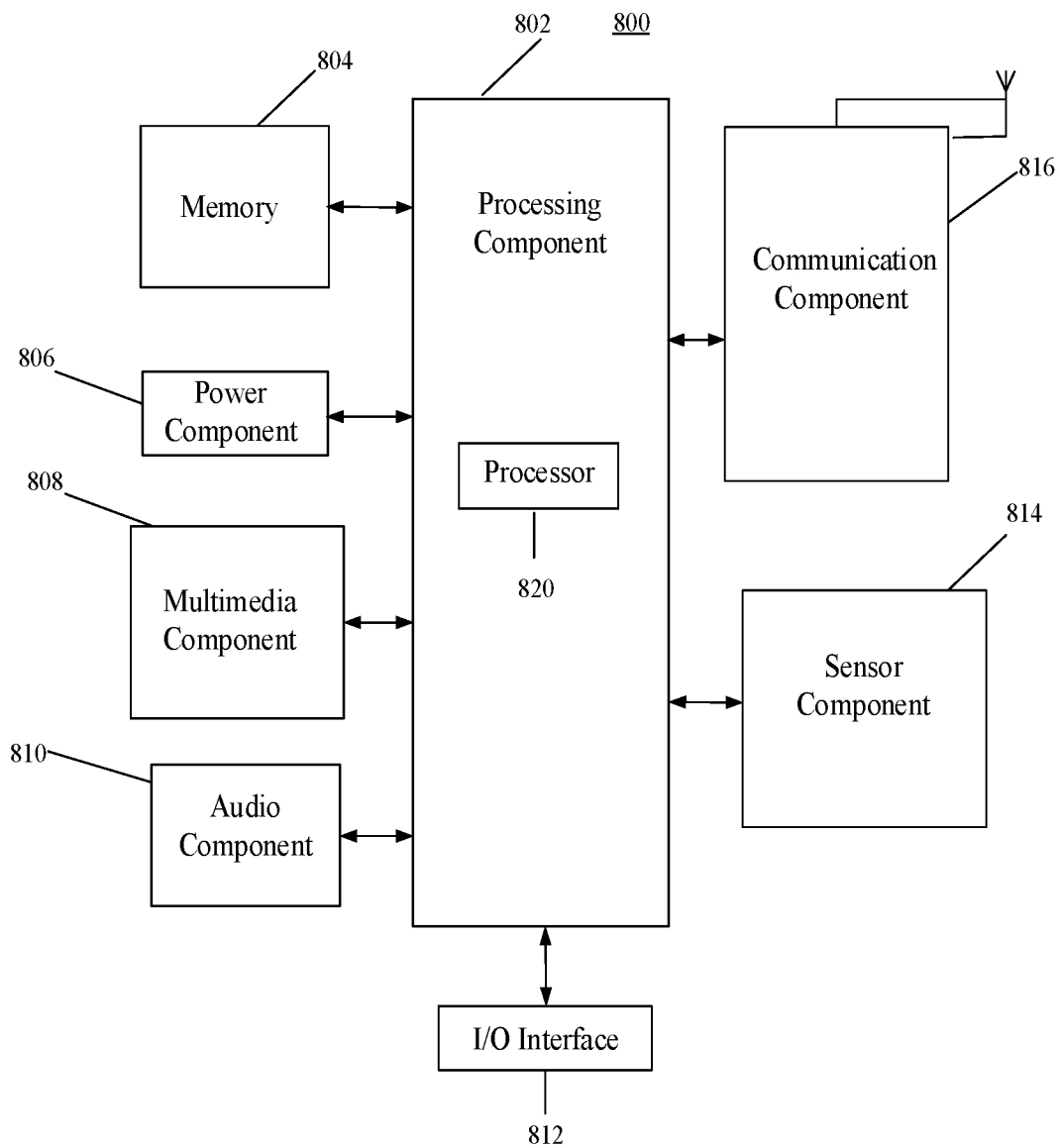
FIG. 9 is a block diagram showing an equipment control apparatus according to some embodiments of the present disclosure.

FIG. 9 is a block diagram of an equipment control apparatus 800, according to some embodiments of the disclosure. For example, the device 800 can be a mobile phone, a computer, a digital broadcast terminal, a messaging device, a gaming console, a tablet, a medical device, exercise equipment, a personal digital assistant, and the like.

Referring to FIG. 9, the device 800 can include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 can include one or more processors 820 to execute instructions to perform all or part of the steps in the above described methods. Moreover, the processing component 802 can include one or more modules which facilitate the interaction between the processing component 802 and other components. For instance, the processing component 802 can include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 can include a power management system, one or more power sources, and other components associated with the generation, management, and distribution of power in the device 800.

The multimedia component 808 includes a screen providing an output interface between the device 800 and the user. In some embodiments, the screen can include a liquid crystal display (LCD) and a touch panel (TP). In some implementations, an organic light-emitting diode (OLED) display can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 808 includes a front camera and/or a rear camera. The front camera and/or the rear camera can receive an external multimedia datum while the device 800 is in an operation mode, such as a photographing mode or a video mode. Each of the front camera and the rear camera can be a fixed optical lens system or have focus and optical zoom capability.

The audio component 810 is configured to output and/or input audio signals. For example, the audio component 810 includes a microphone (MIC) configured to receive an external audio signal when the device 800 is in an operation mode, such as a call mode, a recording mode, and a voice recognition mode. The received audio signal can be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons can include, but are not limited to, a home button, a volume button, a starting button, and a locking button.

The sensor component 814 includes one or more sensors to provide status assessments of various aspects of the device 800. For instance, the sensor component 814 can detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 can include a proximity sensor configured to detect the presence of nearby objects without any physical contact. The sensor component 814 can also include a light sensor, such as a CMOS or CCD image sensor, for use in imaging applications. In some embodiments, the sensor component 814 can also include an accelerometer sensor, a gyroscope sensor, a magnetic sensor, a pressure sensor, or a temperature sensor.

The communication component 816 is configured to facilitate wired or wireless communication between the device 800 and other devices. The device 800 can access a wireless network based on a communication standard, such as Wi-Fi, 2G, 3G, 4G, 5G or a combination thereof. In some embodiments, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 800 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the device 800, for performing the above-described methods. For example, the non-transitory computer-readable storage medium can be a ROM, a random access memory (RAM), a CD-ROM, a magnetic tape, a floppy disc, an optical data storage device, and the like.

Various embodiments of the present disclosure can have the following advantages: by binding the external ultra-wideband positioning device and the equipment to be controlled, when the mobile terminal points to the equipment to be controlled in which the external ultra-wideband positioning device is installed, the external ultra-wideband positioning device can be positioned to, and then the equipment to be controlled that is bound to the external ultra-wideband positioning device is determined. A control interface of the equipment to be controlled that matches the equipment to be controlled is retrieved and displayed at the terminal to control the equipment to be controlled, such that when the terminal points to the equipment to be controlled, the equipment to be controlled that is installed with an external ultra-wideband positioning device is automatically selected and controlled, thereby the equipment to be controlled that originally had no ultra-wideband positioning control can be controlled automatically and intelligently based on the ultra-wideband positioning technologies to improve the operation efficiency.

It can be understood that in the present disclosure, "plurality" refers to two or more than two and other quantifiers are similar. "And/or" describes the association relationship of the associated object, indicating that there can be three types of relationships, for example, A and/or B may indicate three cases: A exists alone, A and B exist at the same time, and B exists alone. The character "/" generally indicates that the associated objects before and after are in an "or" relationship. The singular forms "a", "said" and "the" are also intended to include plural forms, unless the context clearly indicates other meanings.

It can be further understood that the terms "first", "second", etc. are used to describe various information, but this information should not be limited to these terms. These terms are only used to distinguish the same type of information from each other, and do not indicate a specific order or degree of importance. In fact, expressions "first", "second" and the like can be used interchangeably. For example, without departing from the scope of the present disclosure, the first information may also be referred to as second information, and similarly, the second information may also be referred to as first information.

It can be further understood that, unless otherwise specified, "connection" includes a direct connection between two components without other components, and also includes an indirect connection between the two with other elements.

The various device components, units, circuits, blocks, or portions may have modular configurations, or are composed of discrete components, but nonetheless may be referred to as "modules," "components" or "circuits" in general. In other words, the components, units, circuits, blocks, or portions referred to herein may or may not be in modular forms.

The various device components, units, blocks, portions, or modules may be realized with hardware, software, or a combination of hardware and software.

In some embodiments of the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms In some embodiments of the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In some embodiments of the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or retracted from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. An equipment control method, applied to a mobile terminal, the equipment control method comprising:
    positioning, in response to the mobile terminal pointing to equipment to be controlled in which an external ultra-wideband positioning device is installed, the external ultra-wideband positioning device, the external ultra-wideband positioning device having a binding relationship with the equipment to be controlled, and the equipment to be controlled without a built-in ultra-wideband positioning component;
    determining the equipment to be controlled that is bound to the external ultra-wideband positioning device based on the binding relationship, in response to positioning to the external ultra-wideband positioning device; and
    retrieving and displaying a control interface of the equipment to be controlled that matches the equipment to be controlled;
    wherein said determining comprises:
    determining that there is equipment to be controlled in which an external ultra-wideband positioning device is installed, and acquiring a first identifier for uniquely identifying the external ultra-wideband positioning device; and
    creating and saving a binding relationship between the first identifier and the equipment to be controlled;
    wherein said creating and saving a binding relationship between the first identifier and the equipment to be controlled comprises:
    displaying, in a pop-up window, prompt information on a display interface of a predetermined application, in response to positioning to the external ultra-wideband positioning device for the first time, the prompt information being used to guide the generation of a second identifier used to identify the equipment to be controlled;
    generating the second identifier according to an identifier provided by the user based on the prompt information; and
    creating and saving the binding relationship between the first identifier and the second identifier;
    wherein said positioning to the external ultra-wideband positioning device comprises:
    determining positioning to the external ultra-wideband positioning device when the external ultra-wideband positioning device is positioned within a predetermined range of pointing angle with the pointing direction of the mobile terminal.

2. The equipment control method according to claim 1, further comprising:
    switching to a control interface of second equipment to be controlled, which matches the second equipment to be controlled, in response to the mobile terminal pointing to the second equipment to be controlled in which an external ultra-wideband positioning device is installed, in a process of displaying a control interface of first equipment to be controlled by the mobile terminal.

3. An equipment control apparatus for implementing the equipment control method according to claim 1, comprising:
    a processor;
    a storage for storing executable instructions of the processor;
    wherein, the processor is configured to execute steps of the equipment control method.

4. A non-transitory computer-readable storage medium having stored thereon instructions for execution by a processor of a mobile terminal, to enable the mobile terminal to execute the equipment control method according to claim 1.

5. The non-transitory computer-readable storage medium according to claim 4, wherein the equipment control method further comprises:
    switching to a control interface of second equipment to be controlled, which matches the second equipment to be controlled, in response to the mobile terminal pointing to the second equipment to be controlled in which an external ultra-wideband positioning device is installed, in a process of displaying a control interface of first equipment to be controlled by the mobile terminal.

6. A mobile terminal implementing the equipment control method according to claim 1, comprising:
    a displaying screen configured to display a control interface of the equipment to be controlled that matches the equipment to be controlled, and the equipment to be controlled without a built-in ultra-wideband positioning component; and
    a controller configured to control the equipment to be controlled that is installed with the external ultra-wideband positioning device, and determine that there is equipment to be controlled in which an external ultra-wideband positioning device is installed, and acquire a first identifier for uniquely identifying the external ultra-wideband positioning device; and create and save a binding relationship between the first identifier and the equipment to be controlled, wherein the controller is configured to create and save the binding relationship between the first identifier and the equipment to be controlled by:

displaying, in a pop-up window, prompt information on a display interface of a predetermined application, in response to positioning to the external ultra-wideband positioning device for the first time, the prompt information being used to guide the generation of a second identifier used to identify the equipment to be controlled;

generating the second identifier according to an identifier provided by the user based on the prompt information; and creating and saving the binding relationship between the first identifier and the second identifier, wherein when the mobile terminal points to the equipment to be controlled, the equipment to be controlled is automatically selected and controlled by the controller, thereby realizing adding ultra-wideband positioning control functions to equipment that originally do not have the ultra-wideband positioning control functions;

wherein the controller is configured to position to the external ultra-wideband positioning device by:

determining positioning to the external ultra-wideband positioning device when the external ultra-wideband positioning device is positioned within a predetermined range of pointing angle with the pointing direction of the mobile terminal.

7. The mobile terminal according to claim 6, wherein the external ultra-wideband positioning device is fixedly installed on a surface, frame, bottom or back of the equipment to be controlled.

8. The equipment control method according to claim 1, further comprising:

fixedly installing the external ultra-wideband positioning device on a surface, frame, bottom or back of the equipment to be controlled without the built-in ultra-wideband positioning component.

9. An equipment control apparatus, applied to a mobile terminal, the equipment control apparatus comprising:

a positioning circuit configured to position, in response to the mobile terminal pointing to equipment to be controlled in which an external ultra-wideband positioning device is installed, the external ultra-wideband positioning device, the external ultra-wideband positioning device having a binding relationship with the equipment to be controlled, and the equipment to be controlled without a built-in ultra-wideband positioning component;

a determining circuit configured to determine the equipment to be controlled bound to the external ultra-wideband positioning device based on the binding relationship, in response to positioning to the external ultra-wideband positioning device; and a displaying circuit configured to retrieve and display a control interface of the equipment to be controlled that matches the equipment to be controlled;

wherein the determining circuit is further configured to:

determine that there is equipment to be controlled in which an external ultra-wideband positioning device is installed, and acquire a first identifier for uniquely identifying the external ultra-wideband positioning device; and create and save a binding relationship between the first identifier and the equipment to be controlled;

wherein to create and save the binding relationship between the first identifier and the equipment to be controlled, the equipment control apparatus is further configured to:

display, in a pop-up window, prompt information on a display interface of a predetermined application, in response to positioning to the external ultra-wideband positioning device for the first time, the prompt information being used to guide the generation of a second identifier used to identify the equipment to be controlled;

generate the second identifier according to an identifier provided by the user based on the prompt information; and create and save the binding relationship between the first identifier and the second identifier;

wherein the positioning circuit is configured to position to the external ultra-wideband positioning device by:

determining positioning to the external ultra-wideband positioning device when the external ultra-wideband positioning device is positioned within a predetermined range of pointing angle with the pointing direction of the mobile terminal.

10. The equipment control apparatus according to claim 9, further comprising:

a switching circuit, configured to switch to a control interface of second equipment to be controlled, which matches the second equipment to be controlled, in response to the mobile terminal pointing to the second equipment to be controlled in which an external ultra-wideband positioning device is installed, in a process of displaying a control interface of first equipment to be controlled by the mobile terminal.

11. The equipment control apparatus according to claim 9, wherein the external ultra-wideband positioning device is fixedly installed on a surface, frame, bottom or back of the equipment to be controlled.

* * * * *